United States Patent
Alotaibi et al.

(10) Patent No.: US 12,030,040 B2
(45) Date of Patent: *Jul. 9, 2024

(54) METHOD FOR SYNTHESIZING MESOPOROUS NANO-SIZED ULTRA-STABLE Y ZEOLITE

(71) Applicant: Saudi Arabian Oil Company, Dhahran (SA)

(72) Inventors: Faisal Alotaibi, Al Khobar (SA); Lianhui Ding, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,733

(22) Filed: Nov. 29, 2022

(65) Prior Publication Data

US 2024/0173702 A1     May 30, 2024

(51) Int. Cl.

| | |
|---|---|
| *B01J 29/08* | (2006.01) |
| *B01J 35/23* | (2024.01) |
| *B01J 35/61* | (2024.01) |
| *B01J 35/63* | (2024.01) |
| *B01J 35/64* | (2024.01) |
| *B01J 37/00* | (2006.01) |
| *B01J 37/04* | (2006.01) |
| *B01J 37/08* | (2006.01) |
| *B01J 37/30* | (2006.01) |
| *C01B 39/08* | (2006.01) |
| *C01B 39/24* | (2006.01) |

(52) U.S. Cl.
CPC ............. *B01J 29/084* (2013.01); *B01J 35/23* (2024.01); *B01J 35/617* (2024.01); *B01J 35/633* (2024.01); *B01J 35/647* (2024.01); *B01J 37/009* (2013.01); *B01J 37/04* (2013.01); *B01J 37/08* (2013.01); *B01J 37/30* (2013.01); *C01B 39/08* (2013.01); *C01B 39/24* (2013.01); *B01J 2029/081* (2013.01); *B01J 2229/16* (2013.01); *B01J 2229/32* (2013.01); *C01P 2004/64* (2013.01); *C01P 2006/12* (2013.01); *C01P 2006/14* (2013.01); *C01P 2006/16* (2013.01)

(58) Field of Classification Search
CPC ................ B01J 29/084; B01J 2029/081; B01J 2229/16; B01J 2229/32; B01J 35/0013; B01J 35/1023; B01J 35/1038; B01J 35/1042; B01J 35/1057; B01J 35/1061; B01J 35/109; B01J 37/009; B01J 37/04; B01J 37/08; B01J 37/30; C01B 39/026; C01B 39/24; C01P 2004/64; C01P 2006/12; C01P 2006/14; C01P 2006/16
USPC ...................... 502/60, 79; 423/700
See application file for complete search history.

(56) References Cited

U.S. PATENT DOCUMENTS 8,809,573 B2 *   8/2014   Armitage ................ C07C 67/37
                                                      502/25

FOREIGN PATENT DOCUMENTS

| CN | 104591210 B | 8/2016 |
|---|---|---|
| CN | 114426286 A | 5/2022 |
| WO | 2010083488 A2 | 7/2010 |

OTHER PUBLICATIONS

Gola et al., "Effect of leaching agent in the dealumination of stablized Y zeolites", Microporous and Mesoporous Materials, vol. 40, pp. 73-83, 2000.
Li et al., "Realizing the Commercial Potential of Hierarchical Zeolites: New Opportunities in Catalytic Cracking", ChemCatChem, vol. 6, No. 1, pp. 46-66, 2014.
Li et al., "Defects in AHFS-dealuminated Y zeolite: A crucial factor for mesopores formation in the following base treatment procedure", Microporous and Mesoporous Materials, vol. 255, pp. 242-252, 2018.
Martinez et al., "Stablized hierarchical USY zeolite catalysts for simultaneous increase in diesel and LPG olefinicity during catalytic cracking", Catalysis Science & Technology, vol. 3, pp. 972-981, 2013.
Qin et al., Mesoporous Y zeolite with homogeneous aluminum distribution obtained by sequential desilication- dealumination and its performance in the catalytic cracking of cumene and 1,3,5-triisopropylbenzene, Journal of Catalysis, vol. 278, pp. 266-275, 2011.
Qin et al., "A defect-based strategy for the preparation of mesoporous zeolite Y for high-performance catalytic cracking", Journal of Catalysis, vol. 298, pp. 102-111, 2013.

(Continued)

*Primary Examiner* — Elizabeth D Wood
(74) *Attorney, Agent, or Firm* — DINSMORE & SHOHL LLP

(57) ABSTRACT

Methods for synthesizing a mesoporous nano-sized ultra-stable Y zeolite include combining a microporous Y zeolite having a SiO$_2$/Al2O$_3$ molar ratio of less than 5.2 with water to form a microporous Y zeolite slurry and heating the microporous Y zeolite slurry to 30° C. to 100° C. to form a heated microporous Y zeolite slurry. Further the method includes adding a 0.1M to 2.0M ammonium hexafluorosilicate solution and a 0.1M to 2.0M ammonium hydroxide solution in a drop-wise manner, either sequentially or simultaneously, to the heated microporous Y zeolite slurry to form a treated zeolite solution and holding the treated zeolite solution at 50° C. to 100° C. Finally the method includes filtering and washing the dealuminated solution with water to form an ultra-stable Y zeolite precursor, drying the ultra-stable Y zeolite precursor, and calcining the dried zeolite precursor to form the nano-sized ultra-stable Y zeolite.

18 Claims, No Drawings

(56) References Cited

OTHER PUBLICATIONS

Notification of Transmittal of the International Search Report and the Written Opinion of the International Searching Authority, or the Declaration dated Mar. 19, 2024 pertaining to International application No. PCT/US2023/079973 filed Nov. 16, 2023, pp. 1-15.
Yakimov, A.V et al., "Dealumination of Nanosized Zeolites Y" Petroleum Chemistry, Pleiades Publishing, Moscow, vol. 59, No. 5, Jun. 11, 2019, pp. 540-545.
Garralon G et al., "Faujasites dealuminated with ammonium hexafluorosilicate: Variables affecting the method of preparation" ZEOLITES, vol. 8, No. 4, Jul. 1, 1988, pp. 268-272.

* cited by examiner

METHOD FOR SYNTHESIZING MESOPOROUS NANO-SIZED ULTRA-STABLE Y ZEOLITE

BACKGROUND

Field

The present disclosure generally relates to nano-sized mesoporous zeolite compositions and the methods of synthesis and use of these compositions, and more specifically, to method for synthesizing a mesoporous nano-sized ultra-stable Y zeolite including ammonium hexafluorosilicate and ammonium hydroxide treatment of microporous Y zeolite.

Technical Background

Y-type zeolites are crystallized aluminosilicates that are widely used in heavy oil conversion processes such as hydrocracking and fluid catalytic cracking processes. The feedstock to these processes is a portion of the crude oil that has an initial boiling point of 350 Celsius (° C.) and an average molecular weight ranging from about 200 to 600 or greater. Macroporous materials have pores size distributions between 50 and 1000 nanometers (nm). Mesoporous materials have an intermediate pore size distributions, between 2-50 nm. And, microporous materials exhibit pore size distributions in the range of 0.5-2 nm. Conventional Y-type zeolites have pore sizes (<2 nm) that do not allow the large molecules to diffuse in and to react on the active sites located inside the zeolites. Increasing pore size and reducing particle size of the zeolites are two effective ways to enhance mass transfer and thus greatly improve catalyst performance.

Ultra-stable Y zeolite have been generated, but their synthesis has traditionally been based on sequential desilication and dealumination which requires additional steps and processes and impedes economic stability of mesoporous zeolite manufacturing.

BRIEF SUMMARY

Accordingly, there is a clear and long-standing need to provide a solution to synthesizing a mesoporous ultra-stable Y zeolite in a more economical manner. Further, there is a clear and long-standing need to provide a solution to synthesizing a mesoporous nano-sized ultra-stable Y zeolite and leverage the enhanced properties from reduced particle size and increased mesoporosity. The present disclosure addresses such long-standing need by generating mesoporous nano-sized ultra-stable Y zeolite according to a method which utilizes microporous Y zeolite and a single pot post-synthesis treatment with ammonium hexafuorosilicate and ammonium hydroxide.

In accordance with one embodiment of the present disclosure, a method for synthesizing a mesoporous nano-sized ultra-stable Y zeolite includes preparing a 0.1 to 2.0 M ammonium hexafluorosilicate solution; preparing a 0.1 to 2.0 M ammonium hydroxide solution; combining a microporous Y zeolite having a $SiO_2/Al_2O_3$ molar ratio of less than 5.2 with 30 to 1,000 milliliters water per gram of the microporous Y zeolite on a dry basis to form a microporous Y zeolite slurry and heating the microporous Y zeolite slurry to 30° C. to 100° C. to form a heated microporous Y zeolite slurry; and adding the ammonium hexafluorosilicate solution and the ammonium hydroxide solution in a drop-wise manner to the heated microporous Y zeolite slurry to form a treated zeolite solution. The method further concludes holding the treated zeolite solution at 50° C. to 100° C. with stirring for 1 to 24 additional hours; filtering and washing the treated zeolite solution with water to form an ultra-stable Y zeolite precursor; drying the ultra-stable Y zeolite precursor at 80° C. to 150° C. for 6 to 24 hours to form a dried zeolite precursor; and calcining the dried zeolite precursor at 250° C. to 600° C. for 1 to 8 hours to form the mesoporous nano-sized ultra-stable Y zeolite.

In accordance with further embodiments of the present disclosure, the ammonium hexafluorosilicate solution and the ammonium hydroxide solution are added to the microporous Y zeolite slurry simultaneously such that the method further includes mixing the ammonium hexafluorosilicate solution and the ammonium hydroxide solution to form an aqueous treatment solution and adding the aqueous treatment solution in a drop-wise manner to the heated microporous Y zeolite slurry over 1 to 180 minutes to form the treated zeolite solution.

In accordance with further embodiments of the present disclosure, the ammonium hexafluorosilicate solution and the ammonium hydroxide solution are added to the microporous Y zeolite slurry sequentially with the ammonium hexafluorosilicate solution added first and the ammonium hydroxide solution added subsequently. As such, the method further includes adding the ammonium hexafluorosilicate solution in a drop-wise manner to the heated microporous Y zeolite slurry over 1 to 180 minutes to form a dealuminated solution; holding the dealuminated solution at 50° C. to 100° C. with stirring for 1 to 24 additional hours; and adding the ammonium hydroxide solution in a drop-wise manner to the dealuminated solution over 1 to 180 minutes to form the treated zeolite solution.

Additional features and advantages of the technology disclosed herein will be set forth in the detailed description which follows, and in part will be readily apparent to those skilled in the art from that description or recognized by practicing the technology as described herein, including the detailed description which follows, as well as the appended claims.

It is to be understood that both the foregoing general description and the following detailed description present embodiments of the technology, and are intended to provide an overview or framework for understanding the nature and character of the technology as it is claimed. Additionally, following descriptions are meant to be merely illustrative, and are not intended to limit the scope of the claims in any manner.

DETAILED DESCRIPTION

The present disclosure describes various embodiments related to nano-sized mesoporous ultra-stable Y zeolite compositions and methods of synthesis of these compositions.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

Zeolite catalysts are commonly used in heavy oil conversion processes such as hydrocracking and fluid catalytic cracking processes. For example, crude oil may passed through hydro-treating and then hydrocracking catalysts to remove undesired contents, such as sulfur, nitrogen, and metals, and convert high molecular weight hydrocarbons (complex aromatics or unsaturated hydrocarbons) into naphtha, kerosene, gasoline, diesel oil or high-quality lubricating oils. The catalyst used in hydroprocessing has two functions: cracking of high molecular weight hydrocarbons and hydrogenating the unsaturated molecules. However, the small pore size of the most widely used zeolites in hydrocracking catalysts (zeolite beta and Y-type zeolite) has a negative impact on the performance of the catalyst by preventing the large molecules in the heavy oil fraction from diffusing into the active sites located inside the zeolites. This leads to decreased activity of the catalysts and a possible deactivation of the catalysts. The poor diffusion efficiency of the large molecules can be mitigated by either increasing the pore size of the zeolite catalysts, or reducing the particle size of the zeolite catalysts, or combining both features. Disclosed here are mesoporous ultra-stable Y zeolite compositions with average pore size of 2.5 to 6 nm. Increasing the mesoporosity and average pore size during the synthesis of the ultra-stable Y zeolite catalysts impacts the performance of the ultra-stable Y zeolite catalysts by increasing and enabling the diffusion of larger molecules into the active sites located inside the zeolites.

Post synthesis or "top-down" modifications of zeolite Y, such as steaming and acid or chemical dealumination techniques have been used to improve the hydrothermal stability of zeolite Y to prepare USY (ultra-stable Y) zeolite. There have also been efforts to combine framework desilication using known techniques followed by dealumination with ammonium hexafluorosilicate (AHFS) or steaming to generate USY zeolite with defect-guided mesoporosity. However, such sequential desilication-dealumination is time consuming and adds complexity and cost to the synthesis procedures. Embodiments in accordance with the present disclosure have developed alternative methods for synthesizing a mesoporous nano-sized ultra-stable Y zeolite which leverage a one pot synthesis method for post-synthesis modification of nano-sized Y zeolite with ammonium hexafluorosilicate as a chelating agent and ammonium hydroxide. The ammonium hydroxide may be added concurrently or subsequent to the ammonium hexafluorosilicate. Such upgraded synthesis method increases mesoporosity and pore volume, lowers sodium (Na) content in the zeolite, reduces operating costs, and enhances economic viability of mesoporous nano-sized ultra-stable Y zeolite manufacturing.

Generally described in this disclosure are embodiments of Y-type zeolites that may be incorporated into hydrotreating catalysts. The present disclosure relates to methods for producing such zeolites, as well as the properties and structure of the produced zeolites. In some embodiments, the hydrotreating catalysts may be utilized to crack aromatics in heavy oils in a pretreatment process that may take place prior to steam cracking or other downstream processing. According to one or more embodiments, a zeolite composition formed in accordance with the present disclosure may comprise a relatively small particle size and may include mesoporosity. Such zeolite materials may be referred to throughout this disclosure as "mesoporous nano-sized ultra-stable Y zeolite." As used throughout this disclosure, "zeolites" refer to micropore-containing inorganic materials with regular intra-crystalline cavities and channels of molecular dimension. The microporous structure of zeolites (for example, 0.3 nm to 1 nm pore size) may render large surface areas and desirable size-/shape-selectivity, which may be advantageous for catalysis. The mesoporous zeolites described may include, for example, aluminosilicates, titanosilicates, or pure silicates. In one or more embodiments, the zeolites described may include micropores (present in the microstructure of a zeolite), and additionally include mesopores. As used throughout this disclosure, micropores refer to pores in a zeolitic structure that have a diameter of less than or equal to 2 nm and greater than or equal to 0.1 nm, and mesopores refer to pores in a zeolitic structure that have a diameter of greater than 2 nm and less than or equal to 50 nm. The zeolites presently described may be characterized as Y-type (that is, having an aluminosilicate FAU framework type).

Disclosed here are specific methods of synthesis of these nano-sized mesoporous zeolite compositions. In accordance with the present disclosure, a method for synthesizing a mesoporous nano-sized ultra-stable Y zeolite comprises preparing a 0.1 to 2.0 M ammonium hexafluorosilicate solution and preparing a 0.1 to 2.0 M ammonium hydroxide solution. A microporous Y zeolite having a $SiO_2/Al2O_3$ molar ratio of less than 5.2 is combined with 30 to 1,000 milliliters water per gram of the microporous Y zeolite on a dry basis to form a microporous Y zeolite slurry and heating the microporous Y zeolite slurry to 30° C. to 100° C. to form a heated microporous Y zeolite slurry. The ammonium hexafluorosilicate solution and the ammonium hydroxide solution are then added in a drop-wise manner to the heated microporous Y zeolite slurry to form a treated zeolite solution which is held at 50° C. to 100° C. with stirring for 1 to 24 additional hours. The treated zeolite solution is filtered and washed to form an ultra-stable Y zeolite precursor. Finally, the ultra-stable Y zeolite precursor is dried at 80° C. to 150° C. for 6 to 24 hours to form a dried zeolite precursor which is calcined at 250° C. to 600° C. for 1 to 8 hours to form the nano-sized ultra-stable Y zeolite. The method of synthesizing mesoporous nano-sized ultra-stable Y zeolite and each distinct step is discussed in further detail infra.

In one or more embodiments, an aqueous ammonium hexafluorosilicate (AHFS) solution is formed. Specifically, AHFS and water are mixed to form the ammonium hexafluorosilicate solution. In accordance with various embodiments, the ammonium hexafluorosilicate and water are mixed to form a 0.1 to 2.0 M, 0.1 to 2.0 M, 0.1 to 2.0 M, 0.1 to 2.0 M, 0.1 to 2.0 M, or 0.1 to 2.0 M solution. The ammonium hexafluorosilicate and water are mixed until the ammonium hexafluorosilicate is fully dissolved to form the ammonium hexafluorosilicate solution.

In one or more embodiments, an aqueous ammonium hydroxide solution is formed. Specifically, ammonium hydroxide and water are mixed to form the ammonium hydroxide solution. In accordance with various embodiments, the ammonium hydroxide and water are mixed to form a 0.1 to 2.0 M, 0.1 to 2.0 M, 0.1 to 2.0 M, 0.1 to 2.0 M, 0.1 to 2.0 M, or 0.1 to 2.0 M solution. The ammonium hydroxide and water are mixed until the ammonium hexafluorosilicate is fully integrated to form the ammonium hexafluorosilicate solution. In one or more embodiments, the ammonium hexafluorosilicate is added as a concentrated ammonium hexafluorosilicate solution such as a 14 M solution to form the ammonium hexafluorosilicate solution in the disclosed 0.1 to 2.0 M range.

In one or more embodiments, the ammonium hydroxide solution is generated in-situ in the ammonium hexafluorosilicate solution. Specifically, ammonium hydroxide may be added as a concentrated solution to the ammonium hexafluorosilicate solution to generate a final solution in accordance with the ammonium hydroxide solution.

In one or more embodiments, a microporous Y zeolite is combined with water to form a microporous Y zeolite slurry.

In various embodiments, the microporous Y zeolite may be combined with 30 to 1,000 milliliters (ml), 100 to 800 ml, 100 to 600 ml, 100 to 500 ml, 100 to 400 ml, 100 to 300 ml, or 100 to 200 ml of water per gram of the nano-sized Y zeolite on a dry basis to form the microporous Y zeolite slurry. Subsequently, in various embodiments, the microporous Y zeolite slurry is heated to 30° C. to 100° C., 50° C. to 100° C., 70° C. to 95° C., 80° C. to 100° C., or approximately 90° C. with stirring. During AHFS treatment, the heating can accelerate aluminum removal from the zeolite framework and at the same time, silicon in AIFS can insert back the void left by the aluminum removal. If the temperature is not high enough, the reaction speed may be unreasonably slow for practical application.

In one or more embodiments, the microporous Y zeolite has a $SiO_2/Al2O_3$ molar ratio of less than 5.2. Additionally, in various embodiments, the microporous Y zeolite comprises less than 4 wt. %, less than 3.5 wt. %, or less than 3 wt. % of $Na_2O$. Examples of such microporous Y zeolites include CBV-300, CBV-400, and CBV-500, each commercially available from Zeolyst International, Inc. (Conshohocken, PA).

In one or more embodiments, the ammonium hexafluorosilicate solution and the ammonium hydroxide solution are added to the heated microporous Y zeolite slurry to form a treated zeolite solution. The addition of the ammonium hexafluorosilicate solution and the ammonium hydroxide solution may be considered to be in a drop-wise manner with addition using a liquid pump with an accurately controlled flowrate for addition of the ammonium hexafluorosilicate solution and the ammonium hydroxide solution at an industrial scale.

In one or more embodiments, the ammonium hexafluorosilicate solution and the ammonium hydroxide solution are added to the microporous Y zeolite slurry simultaneously. For example, the ammonium hexafluorosilicate solution and the ammonium hydroxide solution, each in accordance with the various embodiments disclosed, may be combined together to form an aqueous treatment solution. Subsequently, the aqueous treatment solution may be added in a drop-wise manner to the heated microporous Y zeolite slurry to simultaneously add the ammonium hexafluorosilicate solution and the ammonium hydroxide solution. In various embodiments, the aqueous treatment solution may be added to the heated microporous Y zeolite slurry over a period of 1 to 180 minutes, 10 to 180 minutes, 30 to 180 minutes, 60 to 180 minutes, 75 to 180 minutes, or 90 to 180 minutes to form the treated zeolite solution.

In one or more embodiments with simultaneous addition of the ammonium hexafluorosilicate solution and the ammonium hydroxide solution, the aqueous treatment solution has a weight ratio of 0.1 to 1.0 relative to the microporous Y zeolite on a dry basis.

In one or more embodiments with sequential addition of the ammonium hexafluorosilicate solution and the ammonium hydroxide solution, the ammonium hexafluorosilicate solution has a weight ratio of 0.1 to 1.0 relative to the microporous Y zeolite on a dry basis and the ammonium hydroxide solution has a weight ratio of 0.1 to 1.0 relative to the microporous Y zeolite on a dry basis.

In one or more embodiments, the ammonium hexafluorosilicate solution and the ammonium hydroxide solution are added to the microporous Y zeolite slurry sequentially with the ammonium hexafluorosilicate solution added first and the ammonium hydroxide solution added subsequently. For example, the ammonium hexafluorosilicate solution, in accordance with the various embodiments disclosed, may be added in a drop-wise manner to the heated microporous Y zeolite slurry in a first operation to from a dealuminated solution. In various embodiments, the ammonium hexafluorosilicate solution may be added to the heated microporous Y zeolite slurry over a period of 1 to 180 minutes, 10 to 180 minutes, 30 to 180 minutes, 60 to 180 minutes, 75 to 180 minutes, or 90 to 180 minutes to form the dealuminated solution. Subsequently, the ammonium hydroxide solution, in accordance with the various embodiments disclosed, may be added in a drop-wise manner to the dealuminated solution in a second operation to from the treated zeolite solution. In various embodiments, ammonium hydroxide solution may be added to the dealuminated solution over a period of 1 to 180 minutes, 10 to 180 minutes, 30 to 180 minutes, 60 to 180 minutes, 75 to 180 minutes, or 90 to 180 minutes to form the treated zeolite solution.

In one or more embodiments, the treated zeolite solution is held at 50° C. to 100° C. with stirring for 1 to 24 additional hours. It will be appreciated that dealumination and silicon insertion with AHSF treatment is a slow process, so after finishing addition of the AHSF, the hold period is desirable to ensure the completion of the reaction. In various further embodiments, the treated zeolite solution is held at 55° C. to 100° C., 60° C. to 100° C., 70° C. to 100° C., 80° C. to 100° C., or 90° C. to 100° C. with stirring for 1 to 24, 1 to 20, 1 to 16, 1 to 12, 1 to 8, 1 to 4, or 1 to 2 additional hours.

In one or more embodiments with sequential addition of the ammonium hexafluorosilicate solution and the ammonium hydroxide solution, the dealuminated solution may be held at 50° C. to 100° C. with stirring for 1 to 24 additional hours before addition of the ammonium hydroxide solution to the dealuminated solution. In various further embodiments, the dealuminated solution is held at 55° C. to 100° C., 60° C. to 100° C., 70° C. to 100° C., 80° C. to 100° C., or 90° C. to 100° C. with stirring for 1 to 24, 1 to 20, 1 to 16, 1 to 12, 1 to 8, 1 to 4, or 1 to 2 additional hours.

In one or more embodiments, the treated zeolite solution is filtered and the collected product is washed with water to form an ultra-stable Y zeolite precursor. Filtering and washing the treated zeolite solution comprises separating the solid products from the treated zeolite solution from any liquid products with a centrifuge or other filtration scheme. The solid products are then mixed with the water to wash the solid products. The resulting solution is then separated with the centrifuge. In various embodiments, the washing and separation may be repeated for a total of 1, 2, 3, 4, or 5 washings.

In one or more embodiments, a wet cake comprising the ultra-stable Y zeolite precursor is dried to form a dried zeolite precursor. In various embodiments, the ultra-stable Y zeolite precursor may be dried at an elevated drying temperature of 80° C. to 150° C., 90° C. to 140° C., 90° C. to 130° C., 90° C. to 120° C., 95° C. to 120° C., 100° C. to 120° C., 100° C. to 115° C., or 100° C. to 110° C. Further, in various embodiments, the ultra-stable Y zeolite precursor may be dried at the elevated drying temperature for a period of 6 to 24 hours, 8 to 18 hours, 10 to 18 hours, 6 to 18 hours, 8 to 14 hours, or 8 to 12 hours. Alternatively, the period of drying at the elevated drying temperature may be considered overnight.

In one or more embodiments, the dried zeolite precursor is calcined to form the nano-sized ultra-stable Y zeolite. In various embodiments, the dried zeolite precursor may be calcined at an elevated calcining temperature of 250° C. to 600° C., 300° C. to 600° C., 400° C. to 600° C., 450° C. to 600° C., 500° C. to 600° C., 550° C. to 600° C., or approximately 550° C. Further, in various embodiments, the dried zeolite precursor may be calcined at the elevated calcining temperature for a period of 1 to 8 hours, 2 to 6 hours, 3 to 6 hours, 4 to 8 hours, 4 to 5 hours, or approximately 4 hours. In one or more embodiments, the ramp rate during calcining is 1 to 3° C. per minute.

Properties of the nano-sized ultra-stable Y zeolite include a surface area of the nano-sized ultra-stable Y zeolite greater than 590 m²/g. In some embodiments, the surface area of the nano-sized ultra-stable Y zeolite can range from 590 m²/g to 800 m²/g, 590 m²/g to 760 m²/g, 590 m²/g to 700 m²/g, or 590 m²/g to 650 m²/g. The average particle size is based on the Brunauer-Emmett-Teller technique (BET) measurement. The pore volume of the nano-sized ultra-stable Y zeolite may be greater than 0.4 ml/g. In some embodiments, the pore volume of the nano-sized ultra-stable Y zeolite can range from 0.4 ml/g to 0.8 ml/g, 0.4 ml/g to 0.7 ml/g, 0.4 ml/g to 0.6 ml/g, or 0.4 ml/g to 0.5 ml/g. The average pore size of the nano-sized ultra-stable Y zeolite can be 2.5 to 6 nm. In some embodiments, the average pore size of the nano-sized ultra-stable Y zeolite can range from 2.5 nm to 5.5 nm, 2.5 nm to 5 nm, 2.5 nm to 4 nm, or 2.5 nm to 3.5 nm. Alternatively, in one or more embodiments, the average pore size of the nano-sized ultra-stable Y zeolite may be greater than 2.5 nm. The pore size may be determined from the surface area and pore volume in accordance with four times the pore volume divided by the surface area based on a spherical particle.

In one or more embodiments, the mesoporous nano-sized ultra-stable Y zeolite comprises a $SiO_2$ to $Al_2O_3$ molar ratio of 8 to 10.

A majority of the pore volume of the mesoporous nano-sized ultra-stable Y zeolite is mesoporous. In various embodiments, at least 60 percent by volume, at least 65 percent by volume, at least 70 percent by volume, at least 75 percent by volume, or at least 80 percent by volume of the pore volume of the mesoporous nano-sized ultra-stable Y zeolite is mesoporous.

The mesoporous nano-sized ultra-stable Y zeolite also comprises a relatively low level of $Na_2O$. It will be appreciated that $Na_2O$ can reduce the zeolite acidity, and greatly reduce cracking activity of the final catalyst containing the zeolite so avoidance of such species in the Y zeolite is desirable. In various embodiments, the mesoporous nano-sized ultra-stable Y zeolite comprises a $Na_2O$ level of less than 1 weight percent (wt. %), less than 0.9 wt. %, less than 0.8 wt. %, less than 0.7 wt. %, less than 0.6 wt. %, or less than 0.5 wt. %.

EXAMPLES

The methods for synthesizing a mesoporous nano-sized ultra-stable Y zeolite will be further clarified by the following examples. The examples are illustrative in nature, and should not be understood to limit the subject matter of the present disclosure.

Three samples of mesoporous Y-type zeolite were prepared to compare synthesis with solely AlFS and synthesis in accordance with methods of the present disclosure utilizing ammonium hexafluorosilicate and ammonium hydroxide in combination. The synthesis of mesoporous nano-sized ultra-stable Y zeolite with simultaneous ammonium hexafluorosilicate and ammonium hydroxide treatment is presented as Inventive Example 1. The synthesis of mesoporous nano-sized ultra-stable Y zeolite with sequential ammonium hexafluorosilicate and ammonium hydroxide treatment is presented as Inventive Example 2. The synthesis of mesoporous Y-type zeolite with solely AHFS treatment is presented as Comparative Example 3.

Inventive Example 1

Mesoporous Y-type zeolite was prepared with post-synthesis AFHS and ammonium hydroxide treatment in a simultaneous manner for Inventive Example 1. In a first vessel, 67 grams of CBV-300 zeolite (commercially available from Zeolyst International, Conshohocken, PA) and 300 ml of de-ionized water were mixed and heated to 90° C. In a separate vessel an aqueous solution of ammonium hexafluorosilicate and ammonium hydroxide was prepared by mixing 16.5 grams of AlFS from Sigma Aldrich and 200 ml of water until the AlFS was dissolved and then adding 2.752 ml of $NH_4OH$ solution from Sigma Aldrich. The resulting aqueous solution of ammonium hexafluorosilicate and ammonium hydroxide represents a 0.46M ammonium hexafluorosilicate solution and 0.2M ammonium hydroxide solution collectively referenced as the aqueous treatment solution. The aqueous treatment solution was then added drop-wise over a period of 2 hours to the first vessel containing a zeolite solution. The temperature of the mixture in the first vessel was then increased to 90 to 95° C. and maintained with stirring for 2 hours. Stirring was terminated and the mixture was allowed to settle for approximately 10 minutes. Subsequently, the resulting product was filtered and washed. Specifically, the resulting product was filtered with filter paper, and separated from the generated solution. The cake on the filter paper was put in a beaker, combined with 1,000 ml water, stirred at room temperature for about 30 minutes, and then filtered again. Such filtering and washing procedure was completed 3 times. The resulting wet cake was dried at 110° C. overnight followed by calcination at 550° C. for 4 hours with a temperature ramp rate of 2° C. per minute.

Inventive Example 2

Mesoporous Y-type zeolite was prepared with post-synthesis AFHS and ammonium hydroxide treatment in a sequential manner for Inventive Example 2. In a first vessel, 67 grams of CBV-300 zeolite (commercially available from Zeolyst International, Conshohocken, PA) and 300 ml of de-ionized water were mixed and heated to 90° C. In a separate vessel an aqueous solution of ammonium hexafluorosilicate was prepared by mixing 16.5 grams of AHFS from Sigma Aldrich and 200 ml of water until the AHFS was dissolved to form an ammonium hexafluorosilicate solution. The resulting ammonium hexafluorosilicate solution represents a 0.46M ammonium hexafluorosilicate solution. The ammonium hexafluorosilicate solution was then added drop-wise over a period of 2 hours to the first vessel containing a zeolite solution. The temperature of the mixture in the first vessel was then increased to 90 to 95° C. and maintained with stirring for 1 hour. To the first vessel 100 ml of a 0.4M ammonium hydroxide solution from Sigma Aldrich was then added drop-wise over a period of 1 hour. The temperature of the mixture in the first vessel was then maintained at 90 to 95° C. with stirring for 1 additional hour. Stirring was terminated and the mixture was allowed to settle for approximately 10 minutes. Subsequently, the resulting product was filtered and washed in the same manner as Inventive Example 1. The resulting wet cake was dried at 110° C. overnight followed by calcination at 550° C. for 4 hours with a temperature ramp rate of 2° C. per minute.

Comparative Example 3

Mesoporous Y-type zeolite was prepared with only post-synthesis AFHS treatment for Comparative Example 3. In a first vessel, 67 grams of CBV-300 zeolite (commercially available from Zeolyst International, Conshohocken, PA) and 300 ml of de-ionized water were mixed and heated to 90° C. In a separate vessel an aqueous solution of ammonium hexafluorosilicate was prepared by mixing 16.5 grams of AHFS from Sigma Aldrich and 200 ml of water representing a 0.46 M solution. The aqueous solution of ammonium hexafluorosilicate was then added drop-wise over a period of 2 hours to the first vessel containing a zeolite solution. The temperature of the mixture in the first vessel was then increased to 90 to 95° C. and maintained with stirring for 2 hours. Stirring was terminated and the mixture was allowed to settle for approximately 10 minutes. Subsequently, the resulting product was filtered and washed in the same manner as Inventive Example 1. The resulting wet cake was dried at 110° C. overnight followed by calcination at 550° C. for 4 hours with a temperature ramp rate of 2° C. per minute.

The properties of the mesoporous Y-type zeolites of Inventive Example, Inventive Example 2, and Comparative Example 3 are presented below in Table 1. Table 1 also includes the properties of the CBV-300 zeolite as a reference. The XRD crystallinity was determined with CBV-300 (Zeolyst International) used as the reference.

TABLE 1

Mesoporous Nano-Sized Y-Type Zeolite Properties

|  | Inventive Example 1 (Simultaneous) | Inventive Example 2 (Sequential) | Comparative Example 3 | CBV-300 |
|---|---|---|---|---|
| $SiO_2/Al_2O_3$, mol/mol | 9.89 | 8.88 | 9.75 | 4.92 |
| $Na_2O$, wt. % | 0.49 | 0.02 | 0.119 | 2.80 |
| Surface area, $m^2/g$ | 592 | 637 | 586 | 633 |
| Pore Volume, $m^2/g$ | 0.45 | 0.41 | 0.38 | 0.37 |
| Average pore size, nm | 3.0 | 2.6 | 2.6 | 2.3 |
| Crystallinity, % | 81 | 83 | 87 | 100 |

As shown in Table 1, the zeolites of Inventive Example 1 and Inventive Example 2 demonstrated improved properties relative to the zeolites of Comparative Example 3. Specifically, comparison of Inventive Example 1 and Inventive Example 2 with Comparative Example 3 illustrates that utilization of AHFS and ammonium hydroxide treatment, in accordance with the present disclosure, achieved greater pore volume and increased surface area.

Based on the foregoing, it should now be understood that various aspects of method for synthesizing a mesoporous nano-sized ultra-stable Y zeolite are disclosed herein.

According to a first aspect of the present disclosure, a method for synthesizing a mesoporous nano-sized ultra-stable Y zeolite comprises preparing a 0.1 to 2.0 M ammonium hexafluorosilicate solution; preparing a 0.1 to 2.0 M ammonium hydroxide solution; combining a microporous Y zeolite having a $SiO_2/Al2O_3$ molar ratio of less than 5.2 with 30 to 1,000 milliliters water per gram of the microporous Y zeolite on a dry basis to form a microporous Y zeolite slurry and heating the microporous Y zeolite slurry to 30° C. to 100° C. to form a heated microporous Y zeolite slurry; adding the ammonium hexafluorosilicate solution and the ammonium hydroxide solution in a drop-wise manner to the heated microporous Y zeolite slurry to form a treated zeolite solution; holding the treated zeolite solution at 50° C. to 100° C. with stirring for 1 to 24 additional hours; filtering and washing the treated zeolite solution with water to form an ultra-stable Y zeolite precursor; drying the ultra-stable Y zeolite precursor at 80° C. to 150° C. for 6 to 24 hours to form a dried zeolite precursor; and calcining the dried zeolite precursor at 250° C. to 600° C. for 1 to 8 hours to form the mesoporous nano-sized ultra-stable Y zeolite.

A second aspect includes the method of the first aspect, in which the ammonium hexafluorosilicate solution and the ammonium hydroxide solution are added to the microporous Y zeolite slurry simultaneously.

A third aspect includes the method of the second aspect, in which the method further comprises mixing the ammonium hexafluorosilicate solution and the ammonium hydroxide solution to form an aqueous treatment solution and adding the aqueous treatment solution in a drop-wise manner to the heated microporous Y zeolite slurry over 1 to 180 minutes to form the treated zeolite solution.

A fourth aspect includes the method of the third aspect, in which the aqueous treatment solution has a weight ratio of 0.1 to 1.0 relative to the microporous Y zeolite on a dry basis.

A fifth aspect includes the method of the first aspect, in which the ammonium hexafluorosilicate solution and the ammonium hydroxide solution are added to the microporous Y zeolite slurry sequentially with the ammonium hexafluorosilicate solution added first and the ammonium hydroxide solution added subsequently.

A sixth aspect includes the method of the fifth aspect, in which the method further comprises adding the ammonium hexafluorosilicate solution in a drop-wise manner to the heated microporous Y zeolite slurry over 1 to 180 minutes to form a dealuminated solution; holding the dealuminated solution at 50° C. to 100° C. with stirring for 1 to 24 additional hours; and adding the ammonium hydroxide solution in a drop-wise manner to the dealuminated solution over 1 to 180 minutes to form the treated zeolite solution.

A seventh aspect includes the method of the sixth aspect, in which the ammonium hexafluorosilicate solution has a weight ratio of 0.1 to 1.0 relative to the microporous Y zeolite on a dry basis and the ammonium hydroxide solution has a weight ratio of 0.1 to 1.0 relative to the microporous Y zeolite on a dry basis.

An eighth includes the method of any of the first through seventh aspects, in which the mesoporous nano-sized ultra-stable Y zeolite comprises a surface area, based on BET measurement, of greater than 590 $m^2/g$.

A ninth aspect includes the method of any of the first through eighth aspects, in which the mesoporous nano-sized ultra-stable Y zeolite comprises a pore volume of greater than 0.4 ml/g.

A tenth aspect includes the method of any of the first through ninth aspects, in which the mesoporous nano-sized ultra-stable Y zeolite comprises an average pore size of 2.5 to 6 nm.

An eleventh aspect includes the method of any of the first through tenth aspects, in which the mesoporous nano-sized ultra-stable Y zeolite comprises a $SiO_2$ to $Al_2O_3$ molar ratio of 8 to 10.

A twelfth aspect includes the method of any of the first through eleventh aspects, in which the mesoporous nano-sized ultra-stable Y zeolite comprises a $Na_2O$ level of less than 1 weight percent.

A thirteenth aspect includes the method of any of the first through twelfth aspects, in which the microporous Y zeolite slurry is heated to 80° C. to 100° C.

A fourteenth aspect includes the method of the third or fourth aspect, in which the treated zeolite solution is held at 90° C. to 100° C. for the 1 to 24 additional hours.

A fifteenth aspect includes the method of the sixth or seventh aspect, in which the dealuminated solution is held at 90° C. to 100° C. for the 1 to 24 additional hours and the treated zeolite solution is held at 90° C. to 100° C. for the 1 to 24 additional hours.

A sixteenth aspect includes the method of any of the first through fifteenth aspects, in which the ultra-stable Y zeolite precursor is dried at 100° C. to 120° C. for 8 to 12 hours.

A seventeenth aspect includes the method of any of the first through sixteenth aspects, in which the zeolite precursor is calcined at 550° C. to 600° C. for 3 to 6 hours to form mesoporous nano-sized ultra-stable Y zeolite.

An eighteenth aspect includes the method of any of the first through seventeenth aspects, in which the ramp rate during calcining is 1 to 3° C. per minute.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided. Further, it should be understood that any two quantitative values assigned to a property may constitute a range of that property, and all combinations of ranges formed from all stated quantitative values of a given property are contemplated in this disclosure.

As used in this disclosure and in the appended claims, the words "comprise," "has," and "include" and all grammatical variations thereof are each intended to have an open, non-limiting meaning that does not exclude additional elements or steps.

Throughout the present description, numerous details are set forth in order to provide a thorough understanding of the various embodiments. In other instances, well-known processes, devices, and systems may not been described in particular detail in order not to unnecessarily obscure the various embodiments, but such would be obtainable by one skilled in the art. Additionally, illustrations of the various embodiments may omit certain features or details in order to not obscure the various embodiments.

What is claimed is:

1. A method for synthesizing a mesoporous nano-sized ultra-stable Y zeolite, the method comprising:
   preparing a 0.1 to 2.0 M ammonium hexafluorosilicate solution;
   preparing a 0.1 to 2.0 M ammonium hydroxide solution;
   combining a microporous nano-sized Y zeolite having a $SiO_2/Al2O_3$ molar ratio of less than 5.2 with 30 to 1,000 milliliters water per gram of the microporous Y zeolite on a dry basis to form a microporous Y zeolite slurry and heating the microporous Y zeolite slurry to 30° C. to 100° C. to form a heated microporous Y zeolite slurry;
   adding the ammonium hexafluorosilicate solution and the ammonium hydroxide solution in a drop-wise manner to the heated microporous Y zeolite slurry to form a treated zeolite solution;
   holding the treated zeolite solution at 50° C. to 100° C. with stirring for a period of 1 to 24 hours;
   filtering and washing the treated zeolite solution with water to form an ultra-stable Y zeolite precursor;
   drying the ultra-stable Y zeolite precursor at 80° C. to 150° C. for 6 to 24 hours to form a dried zeolite precursor; and
   calcining the dried zeolite precursor at 250° C. to 600° C. for 1 to 8 hours to form the mesoporous nano-sized ultra-stable Y zeolite.

2. The method of claim 1, wherein the ammonium hexafluorosilicate solution and the ammonium hydroxide solution are added to the microporous Y zeolite slurry simultaneously.

3. The method of claim 2, wherein the method further comprises:
   mixing the ammonium hexafluorosilicate solution and the ammonium hydroxide solution to form an aqueous treatment solution; and
   adding the aqueous treatment solution in a drop-wise manner to the heated microporous Y zeolite slurry over 1 to 180 minutes to form the treated zeolite solution.

4. The method of claim 1, wherein the ammonium hexafluorosilicate solution and the ammonium hydroxide solution are added to the microporous Y zeolite slurry sequentially with the ammonium hexafluorosilicate solution added first and the ammonium hydroxide solution added subsequently.

5. The method of claim 4, wherein the method further comprises:
   adding the ammonium hexafluorosilicate solution in a drop-wise manner to the heated microporous Y zeolite slurry over 1 to 180 minutes to form a dealuminated solution;
   holding the dealuminated solution at 50° C. to 100° C. with stirring for a holding time of 1 to 24 hours; and
   adding the ammonium hydroxide solution in a drop-wise manner to the dealuminated solution over 1 to 180 minutes to form the treated zeolite solution.

6. The method of claim 3, wherein the aqueous treatment solution has a weight ratio of 0.1 to 1.0 relative to the microporous Y zeolite on a dry basis.

7. The method of claim 5, wherein the ammonium hexafluorosilicate solution has a weight ratio of 0.1 to 1.0 relative to the microporous Y zeolite on a dry basis and the ammonium hydroxide solution has a weight ratio of 0.1 to 1.0 relative to the microporous Y zeolite on a dry basis.

8. The method of claim 1, wherein the mesoporous nano-sized ultra-stable Y zeolite comprises a surface area, based on BET measurement, of greater than 590 $m^2/g$.

9. The method of claim 1, wherein the mesoporous nano-sized ultra-stable Y zeolite comprises a pore volume of greater than 0.4 ml/g.

10. The method of claim 1, wherein the mesoporous nano-sized ultra-stable Y zeolite comprises an average pore size of 2.5 to 6 nm.

11. The method of claim 1, wherein the mesoporous nano-sized ultra-stable Y zeolite comprises a $SiO_2$ to $Al_2O_3$ molar ratio of 8 to 10.

12. The method of claim 1, wherein the mesoporous nano-sized ultra-stable Y zeolite comprises a $Na_2O$ level of less than 1 weight percent.

13. The method of claim 1, wherein the microporous Y zeolite slurry is heated to 80° C. to 100° C.

14. The method of claim 3, wherein the treated zeolite solution is held at 90° C. to 100° C. for the period of 1 to 24.

15. The method of claim 5, wherein the dealuminated solution is held at 90° C. to 100° C. for the holding time of 1 to 24 hours and the treated zeolite solution is held at 90° C. to 100° C. for the period of 1 to 24.

16. The method of claim 1, wherein the ultra-stable Y zeolite precursor is dried at 100° C. to 120° C. for 8 to 12 hours.

17. The method of claim 1, wherein the dried zeolite precursor is calcined at 550° C. to 600° C. for 3 to 6 hours to form mesoporous nano-sized ultra-stable Y zeolite.

18. The method of claim 1, wherein a ramp rate during calcining is 1 to 3° C. per minute.

\* \* \* \* \*